US007610492B2

(12) United States Patent
Awatsu et al.

(10) Patent No.: US 7,610,492 B2
(45) Date of Patent: Oct. 27, 2009

(54) BIOMETRIC AUTHENTICATION DEVICE, BIOMETRIC INFORMATION AUTHENTICATION METHOD, AND PROGRAM

(75) Inventors: Kiyotaka Awatsu, Inagi (JP); Sagiri Okamura, Inagi (JP); Takumi Kishino, Inagi (JP); Yasuyuki Higashiura, Inagi (JP); Takahiro Kudo, Maebashi (JP); Toshinori Makino, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 751 days.

(21) Appl. No.: 11/118,493

(22) Filed: May 2, 2005

(65) Prior Publication Data

US 2006/0080550 A1 Apr. 13, 2006

(30) Foreign Application Priority Data

Oct. 8, 2004 (JP) ............................ 2004-296960

(51) Int. Cl.
*G06F 21/00* (2006.01)

(52) U.S. Cl. ...................................... 713/186; 713/185

(58) Field of Classification Search ................. 713/186; 382/115; 902/3
See application file for complete search history.

(56) References Cited

U.S. PATENT DOCUMENTS

2004/0059925 A1 3/2004 Benhammou et al.

FOREIGN PATENT DOCUMENTS

| | | | |
|---|---|---|---|
| DE | 199 35 945 | A1 | 2/2001 |
| EP | 0 645 919 | A2 | 5/1995 |
| EP | 0 789 335 | A2 | 8/1997 |
| EP | 0 864 996 | A2 | 9/1998 |
| EP | 0 973 134 | A1 | 1/2000 |
| EP | 1 237 091 | A1 | 9/2002 |
| FR | 2 786 007 | | 5/2000 |
| JP | 10-312459 | | 11/1998 |
| JP | 2000-293643 | A | 10/2000 |
| WO | WO 01/78021 | A2 | 10/2001 |

OTHER PUBLICATIONS

European Search Report dated Nov. 9, 2005.

*Primary Examiner*—Kambiz Zand
*Assistant Examiner*—Shahrouz Yousefi
(74) *Attorney, Agent, or Firm*—Westerman, Hattori, Daniels & Adrian, LLP.

(57) ABSTRACT

A biometric authentication device has high security by preventing intra-device information from being falsified and stolen by a third party. A biometric authentication device includes a biometric information storage module, a biometric information authenticating module for individual authentication, a mutual authentication module with the terminal, a registration counter corresponding to the mutual authentication, an authentication counter corresponding to the biometric authentication, a stoppage flag set when the value of the counter is larger than a predetermined value, and authentication control module for preventing the module from operating depending on the stoppage flag.

5 Claims, 6 Drawing Sheets

BIOMETRIC AUTHENTICATION DEVICE, BIOMETRIC INFORMATION AUTHENTICATION METHOD, AND PROGRAM

BACKGROUND OF THE INVENTION

1. Field of the Present Invention

The present invention relates to a biometric authentication device for authenticating an individual by utilizing biometric information of human being.

2. Description of the Related Art

At the present, a method of employing a code number PIN (Personal Identification Number) stored in a magnetic card, an IC card, etc. exists as a method of authenticating a specified individual in drawing from a bank account, purchasing a commercial article and entering/exiting a facility. In this type of individual authentication method, however, if a card and a code number are stolen, a third party might easily break into the individual information.

Such being the case, over the recent years, with an increase in internal storage capacity of the IC card, there ha s been proposed a method of authenticating the individual by use of individual biometric information such as a fingerprint, an iris, a retina, a blood vessel image and a voiceprint.

As t he method of authenticating the individual by use of the biometric information, there is proposed a method of authenticating the individual by using the biometric information stored in the IC card (refer to Patent documents "JP 2000-293643 A" and "JP 10-312459 A")

Even the individual authentication method based on the biometric information, however, still has a problem in terms of security. An access to intra-card data of the IC card involves utilizing a terminal for the IC card, however, an authentication program on this terminal can be comparatively easily altered, and hence the individual registration data registered in the IC card might be falsified and stolen by such a vicious program.

SUMMARY OF THE INVENTION

It is an object of the present invention to provide a biometric authentication device getting high security by preventing the information within the device from being falsified and stolen by a third party.

The present invention adopts the following configurations in order to solve the problems described above. Namely, the present invention is a biometric authentication device comprising a biometric information storage module for storing biometric information, biometric information authenticating module for performing authentication by use of biometric information acquired when executing the individual authentication and the biometric information stored in the biometric information storage module, mutual authentication module for mutually authenticating, when acquiring the biometric information for the authentication from a connected processing device, validity with the processing device, a registration counter counted if the validity is not authenticated in the authentication by the mutual authentication module, an authentication counter counted if the validity is not authenticated in the authentication by the biometric information authenticating module, a stoppage flag set when the registration counter or the authentication counter comes to a predetermined value, and an authentication control module performing control of inhibiting an access to the biometric information storage module when the stoppage flag is set, and of preventing the biometric information authenticating module from executing the authentication process.

In the present invention, the mutual authentication when registering the biometric information and the biometric information authentication when executing the individual authentication of the present user, are performed, and, if the validity can not be authenticated as a result of each authentication, the registration counter or the authentication counter corresponding to the respective authentication is counted up. Further, there is provided a stoppage flag that is set when the registration counter or the authentication counter comes to a value larger than a predetermined value. When this stoppage flag is set, the authentication process is stopped.

Therefore, according to the present invention, the biometric authentication device controls as to whether or not the authentication process is to be stopped based on the stoppage flag, and it is therefore possible to automatically stop the authentication process by the device itself without transferring and receiving the data to and from other processing device connected thereto. Further, in each authentication, the stoppage of the authentication process is controlled by using the single stoppage flag, and hence it is feasible to regulate batch-wise the unlawful actions from different sides, such as the unlawful registration of the biometric information and the unlawful authentication of the biometric information. When the stoppage flag is set, all the authentication processes do not run, and therefore it is possible to reduce the number of unlawful attacks from the unlawful user.

More essentially, it is possible to perform the biometric authentication with the high security by preventing the information within the biometric authentication device from being leaked out.

Further, in the biometric authentication device of the present invention, the biometric information storage module can be read from outside, while the registration counter, the authentication counter and the stoppage flag can not be read from outside.

Accordingly, it is feasible to prevent the unlawful user from unlawfully referring to these counters and the stoppage flag and also to prevent the unlawful user from falsifying the information within the biometric authentication device.

Note that the present invention may also be a program for actualizing any one of the functions given above. Moreover, in the present invention, such a program may be stored on a storage medium readable by a computer.

According to the present invention, it is possible to provide the biometric authentication device with the high security by preventing a third party from falsifying and stealing the information within the device.

DESCRIPTION OF THE PREFERRED EMBODIMENTS

A biometric authentication system according to a best mode (which will hereinafter be termed an embodiment) for carrying out the present invention will be described with reference to the drawings. A configuration of the embodiment is an exemplification, and the present invention is not limited to the configuration of the embodiment.

<System Architecture>

Figure 1:
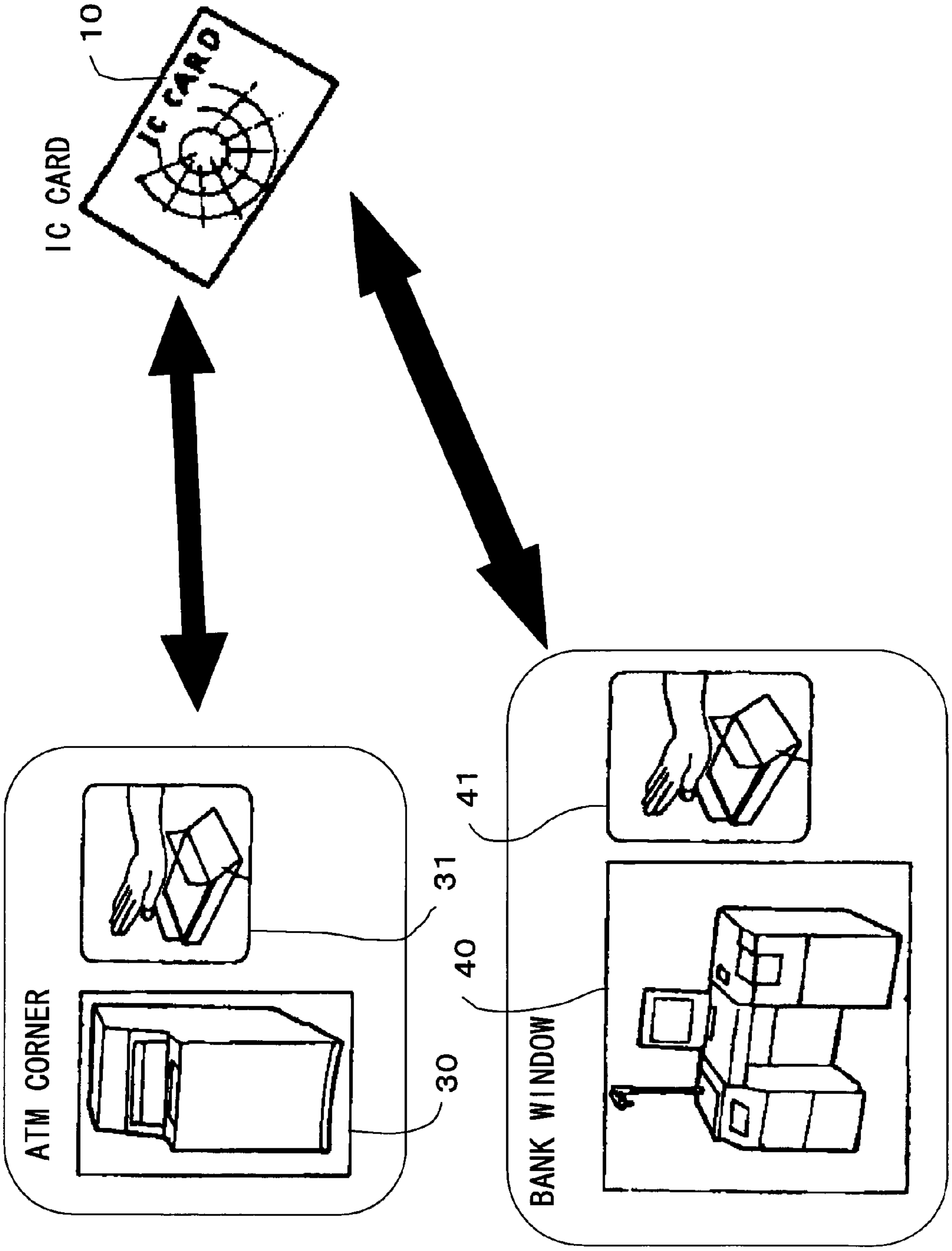
FIG. 1 is a view showing an architecture of a biometric authentication system in an embodiment of the present invention; distribution rule table.

FIG. 1 is a view of architecture of a biometric authentication system in the embodiment of the present invention. The embodiment will exemplify a case of utilizing the biometric authentication system according to the present invention for banking services. The system architecture will be explained together with a mode of utilizing this system for the banking services. Note that the biometric authentication system according to the present invention is not specialized in the banking services.

A user, on the occasion of getting a variety of services of a bank, at first, establishes a bank account and gets issuance of an IC card 10 used as a cash card. Upon the issuance of the IC card 10, the user registers user's own biometric information in the IC card 10 at a bank window. Given herein is a case of adopting venous information based on an image of blood vessels of a hand as the biometric information, and also exemplified herein is a case of utilizing the IC card as a biometric authentication device. When making registration thereof, the user inserts the IC card 10 into a window terminal (which will hereinafter simply be called a terminal) (corresponding to a processing device according to the present invention) 40, and puts the hand over an imaging unit 41 provided on the terminal 40, thus registering the venous information of the user's hand in the IC card 10. Note that the biometric information may involve using, e.g., fingerprint information, iris information, face information, etc. in addition to the venous information. Further, the biometric authentication device may involve using a portable information terminal such as a PDA (Personal Digital Assistant), etc., a cellular phone, etc. in addition to the IC card.

Thereafter, the user, in the case of depositing and paying money to and from an ATM (Automatic Teller Machine), etc., inserts the IC card 10 registered with the biometric information into the ATM (which will hereinafter be referred to as a terminal) (corresponding to a processing device according to the present invention) 30, and puts the hand over an imaging unit 31 provided on the terminal 30, thus verifying user's identity, whereby the user gets the services such as paying-in, paying-out, etc.

Each of the terminals 30 and, 40 is connected via a network to a bank on-line system (un-illustrated) for processing a variety of banking operations. Herein, the banking operations will be explained as functions of the terminals 30 and 40, including processes executed by the bank on-line system connected to the terminals 30 and 40. Further, the terminal 30 serving as the ATM is distinguished from the terminal 40 used for bank window operations, however, the respective processes may also be conducted on one single terminal.

Each of the terminals 30 and 40, when the IC card 10 is inserted via an insertion port (un-illustrated) thereof, performs communications with the IC card 10, and exchanges various pieces of information stored on the IC card 10. The communications between the IC card 10 and the respective terminals 30 and 40 utilize a contact technique specified in, e.g., ISO/IEC7816, etc. and a non-contact technique utilizing radio waves, etc. Moreover, the terminals 30 and 40 have the imaging units 31 and 41 for acquiring the venous information respectively. The imaging units 31 and 41, when putting the hand over these imaging units, capture images of the blood vessels, and create venous information from the image information thereof.

<Internal Configuration of IC Card>

Figure 2:
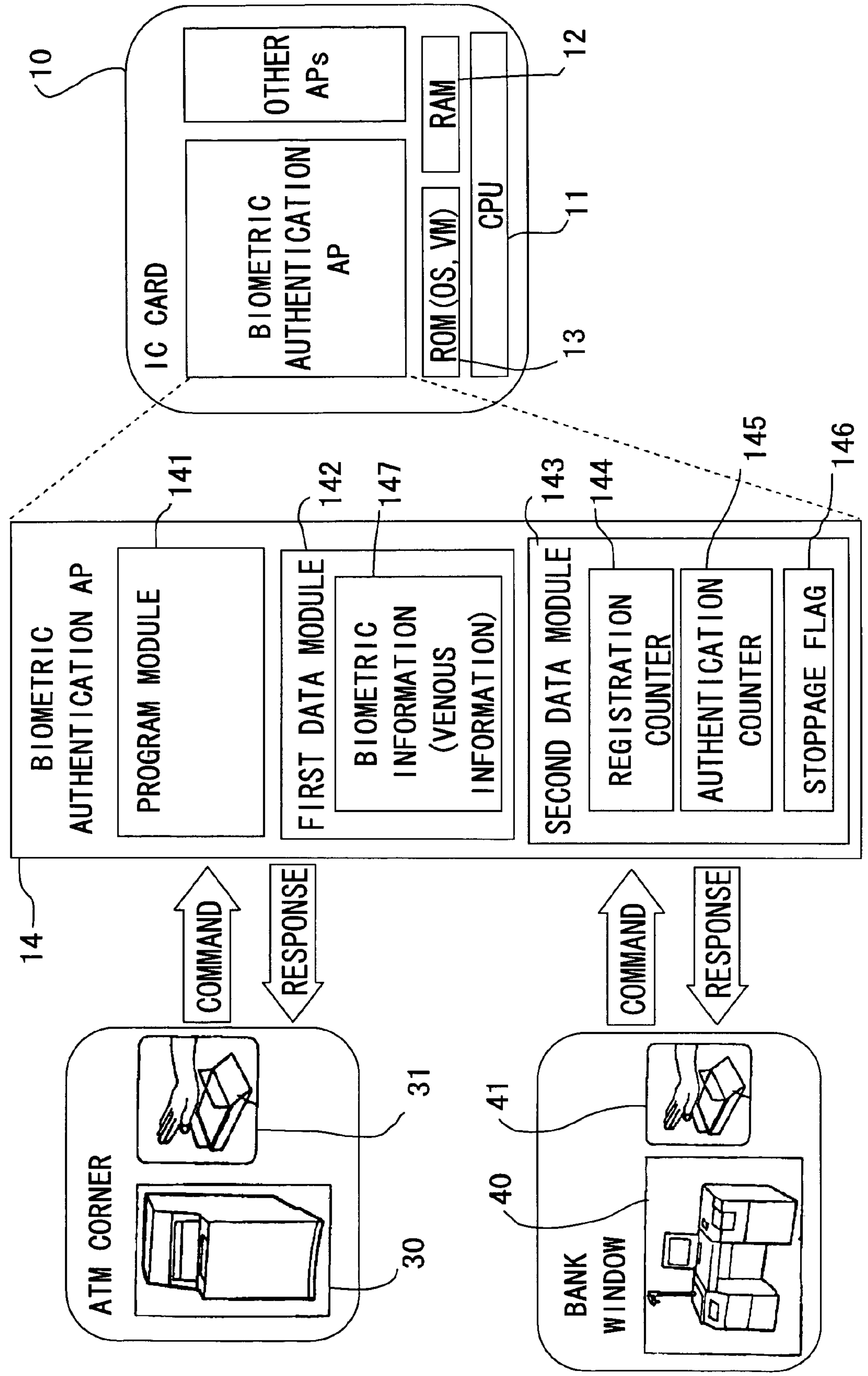
FIG. 2 is a view showing an internal configuration of an IC card.

Next, an internal configuration of the IC card 10 will be explained with reference to FIG. 2. FIG. 2 is a view showing the internal configuration of the IC card 10.

The IC card 10 is constructed of a CPU 11, a RAM 12, a ROM 13, an interface (not shown), etc.. Then, the CPU 11 reads and operates a variety of programs stored on the ROM 13, thereby executing a variety of processes.

Applications stored on the IC card 10 include a variety of applets, such as a biometric authentication applet (which will hereinafter be simply termed a biometric authentication AP) 14, based on services supported by the IC card 10.

The biometric authentication AP 14 executes a process (which will hereinafter be called a biometric information registering process) of registering the venous information of the user (which will hereinafter be called the user biometric information) in the IC card 10, and a process (which will hereinafter be termed a biometric information authenticating process) of verifying the user identity from the user biometric information registered in the IC card 10.

The biometric authentication AP 14 is constructed of a program module 141, a first data module 142, a second data module 143, etc. in order to execute the processes given above. The program module 141 is stored with a program for executing the variety of processes of the biometric authentication AP 14. The program stored therein executes the biometric information registering process between the terminal 40 and the IC card 10 (which corresponds to mutual authentication module according to the present invention), the biometric information authenticating process (which corresponds to biometric information authenticating module according to the present invention) between the terminal 30 and the IC card 10, controls operating and stopping the respective processes (which corresponds to authentication control module according to the present invention), and so on.

The first data module 142 is constructed of a biometric information storage module 147 for storing the venous information of the user, and so forth. The second data module 143 exists in a memory area unreadable from outside and is constructed of a registration counter 144, an authentication counter 145, a stoppage flag 146, etc.

The registration counter 144 is a counter counted up if the terminal 40 is unable to authenticate the IC card 10 or if the IC card 10 is unable to authenticate the terminal 40 in the mutual authentication between the terminal 40 and the IC card 10 when in the biometric information registering process.

The authentication counter 145 is a counter counted up if the user biometric information registered in the IC card 10 is not coincident with the user biometric information acquired in the imaging unit of the terminal 30 in the authentication conducted when in the biometric information authenticating process.

The stoppage flag 146 is a flag referred to which the biometric authentication AP stored in the program module 141 refers. The stoppage flag 146 is expressed by a numerical value of, e.g., 0 or 1, and may be so defined as to be used in the way that "0" represents a non-set state, and "1" represents a set state. The stoppage flag 146 is the flag set by the biometric authentication AP when the registration counter 144 or the authentication counter 145 comes to a predetermined value. The biometric authentication AP judges from the stoppage flag 146 whether the biometric information registering process and the biometric information authenticating process are executed or not. Namely, in the state where the stoppage flag 146 is set, it follows that the biometric authentication AP stops all the processes. Note that other applets may operate irrespective of the stoppage flag 146.

<Example of Operations>

Next, the processes of the biometric authentication AP will be explained with reference to FIGS. 3 to 6. In the following discussion, for clarity of the explanation, the processes of the biometric authentication AP will be described as the operations of the IC card 10. The IC card 10 (the biometric authentication AP) executes roughly the two processes (the biometric information registering process and the biometric information authenticating process) described above.

(Operation of IC Card in Registration of Biometric Information)

Figure 3:
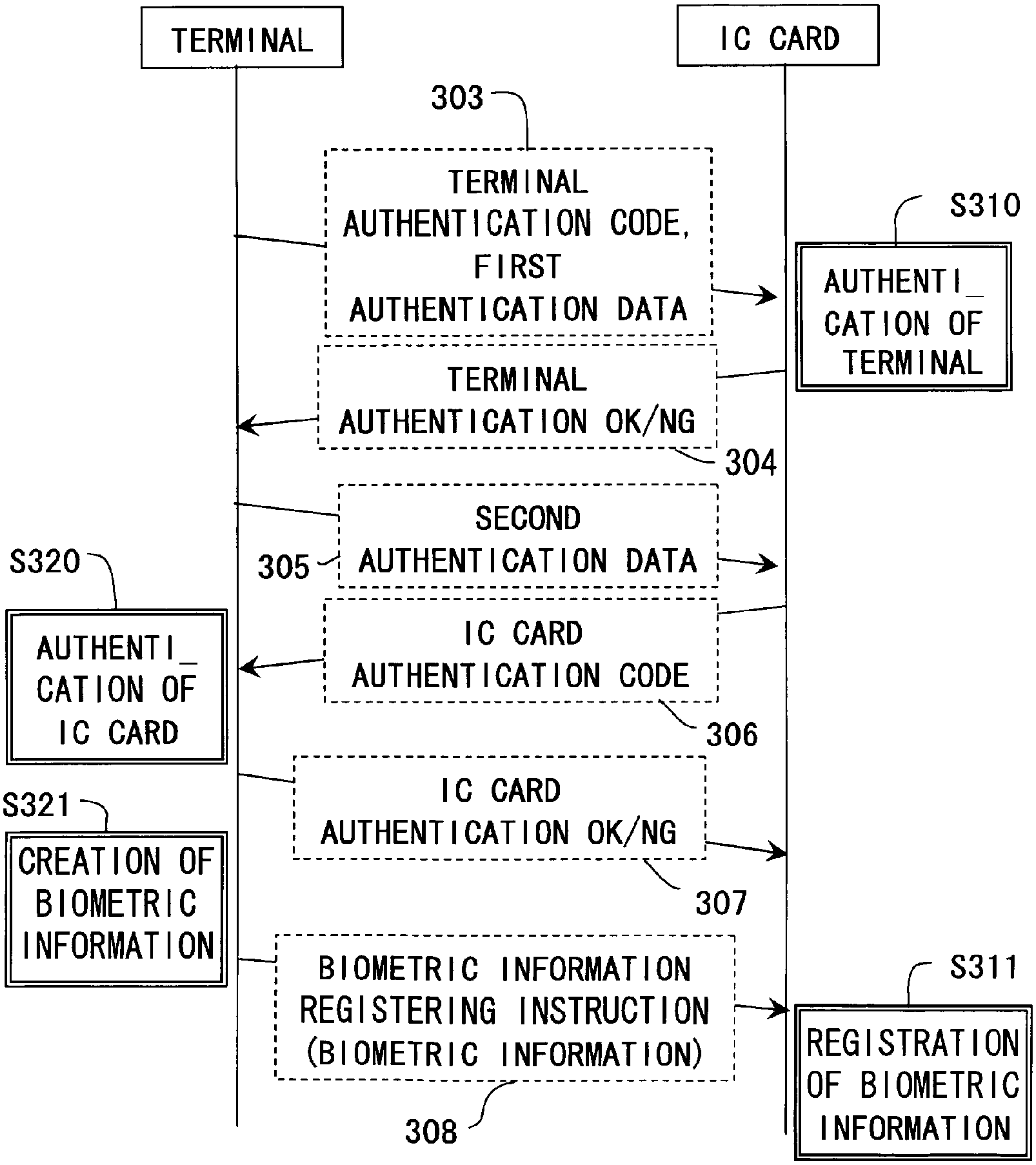
FIG. 3 is a view showing how information is transferred and received between a terminal and the IC card when registering biometric information.

To start with, the operation of the IC card 10 when registering the biometric information will be explained with reference to FIGS. 3 and 4. FIG. 3 is a sequence chart, when registering the biometric information, showing how the information is exchanged between the terminal 40 and the IC card 10 that configure the biometric authentication system according to the present invention.

When the terminal 40 and the IC card 10 come to a state of getting communicable with each other, the terminal 40 and the IC card 10 perform the mutual authentication. Namely, the terminal 40 verifies validity of the IC card 10, while the IC card 10 verifies validity of the terminal 40. To be specific, the terminal 40 and the IC card 10 each have a common key and mutually authenticate the validity by verifying that both of them share this common key with each other.

The terminal 40 transmits a terminal authentication code and first authentication data (303) to the IC card 10. This terminal authentication code is, for instance, a hash code generated on the terminal 40 and is generated by encrypting the first authentication data with the common key held by the terminal 40. The first authentication data is, for example, a random number generated on the terminal 40.

The IC card receiving the terminal authentication code and the first authentication data generates, by the same method as the terminal 40 does, a terminal authentication code as well as the first authentication data by use of the common key held by the IC card 10. Then, the IC card 10 collates the terminal authentication code received from the terminal 40 with the terminal authentication code generated by the card 10 itself, thereby authenticating the validity of the terminal 40 (S310: terminal authentication). The IC card 10 sends a result (304) of the terminal authentication (S310) to the terminal 40.

The terminal 40 receiving the result (304) of the terminal authentication (S310) generates second authentication data (305) and sends to the IC card 10. The second authentication data (305) is, e.g., a random number generated on the terminal 40. Further, herein, the second authentication data (305) is generated on the terminal 40 and may also be generated on the IC card 10. The IC card 10 generates a hash code by encrypting the received second authentication data (305) with the common key held by the IC card 10 itself, and transmits the hash code as an IC card authentication code (306) to the terminal 40.

The terminal 40 receiving the IC card authentication code generates an IC card authentication code by use of the self-generated second authentication data (305) and the self-held common key, and collates the thus generated IC card authentication code with the received IC card authentication code (306). Thus, the terminal 40 authenticates the validity of the received IC card authentication code (S320: IC card authentication). The terminal 40 transmits a result (307) of the IC card authentication (S320) to the IC card 10.

Upon completion of mutually authenticating the validity through the mutual authentication, the terminal 40 acquires and generates the biometric information of the user from the imaging unit 41 (S321). Then, the terminal 40 sends, to the IC card 10, the biometric information (308) together with a biometric information registering instruction in order to register this piece of biometric information in the IC card 10. Finally, the IC card 10 registers the biometric information received from the terminal 40 (S311).

(Explanation of Operation Flow of IC Card 10 in Registration of Biometric Information)

Figure 4:
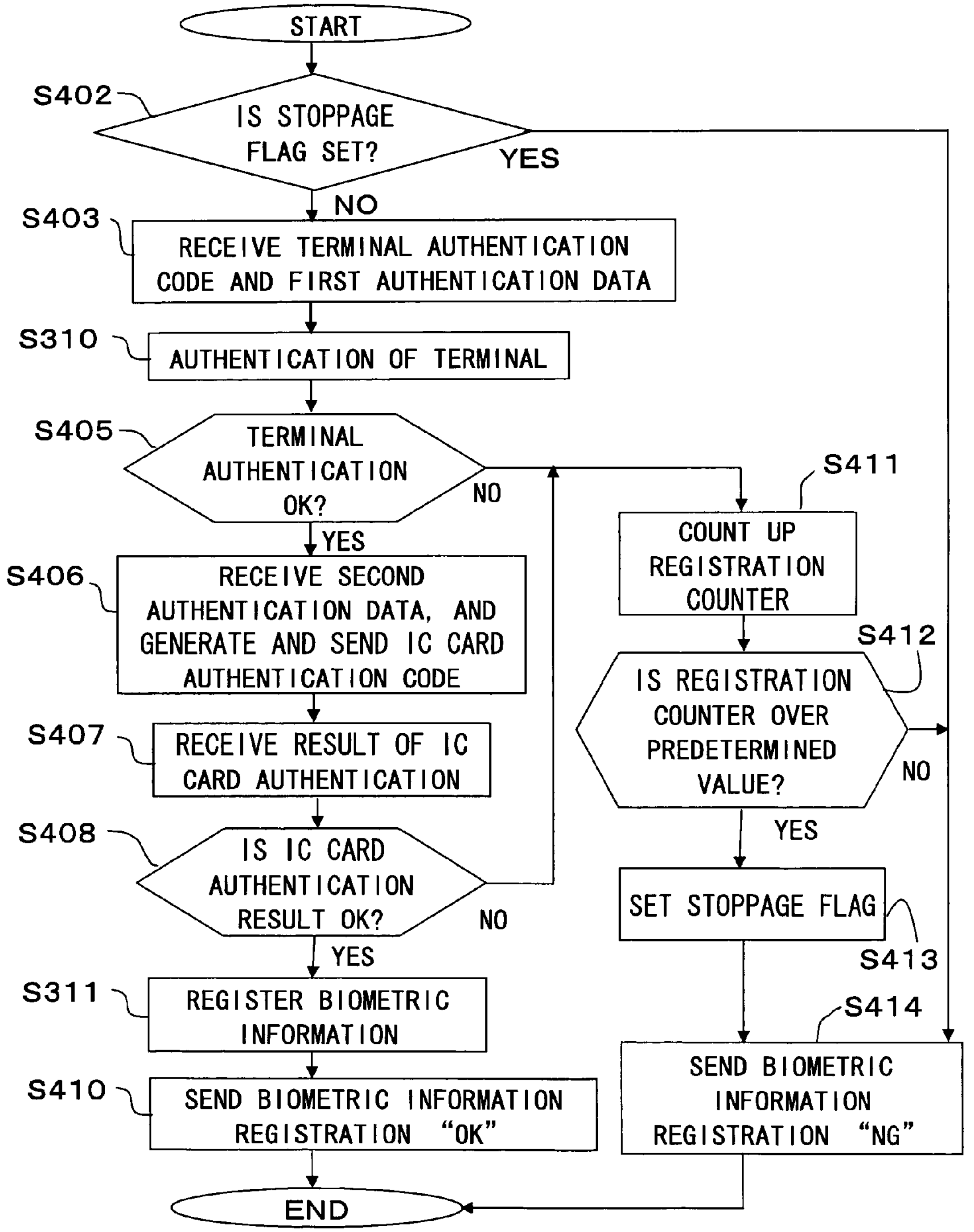
FIG. 4 is a diagram showing a processing flow when in the biometric information registration of the IC card.

FIG. 4 is a processing flowchart in the biometric information registration of the IC card 10, and shows an operation of the IC card 10 in the process sequence described above. Note that the same processes as those of the IC card 10 shown in FIG. 3 are given the same numerals and symbols also in FIG. 4 (S310, and S311).

The IC card 10, upon executing the biometric information registering process, at first checks whether the stoppage flag 146 is set or not (S402). In the case where the stoppage flag 146 has already been set (S402: YES), the terminal 40 is notified of a purport that the biometric information can not be registered (S414).

The IC card 10, if the stoppage flag 146 is not set (S402: NO), receives the terminal authentication code and the first authentication data that will be sent from the terminal 40 later on (S403). Then, the IC card 10 authenticates the validity of this terminal authentication code by use of the self-held common key and the authentication data (S310). When the validity of the received terminal authentication code is authenticated as a result of the terminal authentication (S310) (S405: YES), the IC card 10 generates the IC card authentication code by using the second authentication data received from the terminal 40 and the self-held common key, and sends the thus-generated code to the terminal 40 (S406). Thereafter, the IC card 10 receives a result of the IC card authentication (S320) made by the terminal 40 (S407). Then, when the validity of the IC card authentication code is authenticated as a result of the IC card authentication (S408: YES), the IC card 10 registers the biometric information transmitted from the terminal 40 (S311). Finally, the IC card 10 notifies the terminal 40 of a purport that the biometric information is normally registered (S410).

Whereas if not normally authenticated through the mutual authentication, i.e., if the validity of the received terminal authentication code is not authenticated as a result of the terminal authentication (S310) (S405: NO), or if the validity of the IC card authentication code is not authenticated as a result of the IC card authentication (S320) by the terminal 40 (S408; NO), the registration counter 144 is counted up in both cases (S411). Then, as a result, when a value of the registration counter 144 becomes larger than a predetermined value (S412; NO), the IC card 10 sets the stoppage flag 146 (S413), and notifies the terminal 40 of a purport that the biometric information can not be registered (S414). Note that if the value of the registration counter 144 is equal to or smaller than the predetermined value (S412; YES), the IC card 10 directly notifies the terminal 40 of the purport that the biometric information can not be registered (S414).

(Explanation of Operation in Biometric Information Authentication)

Figure 5:
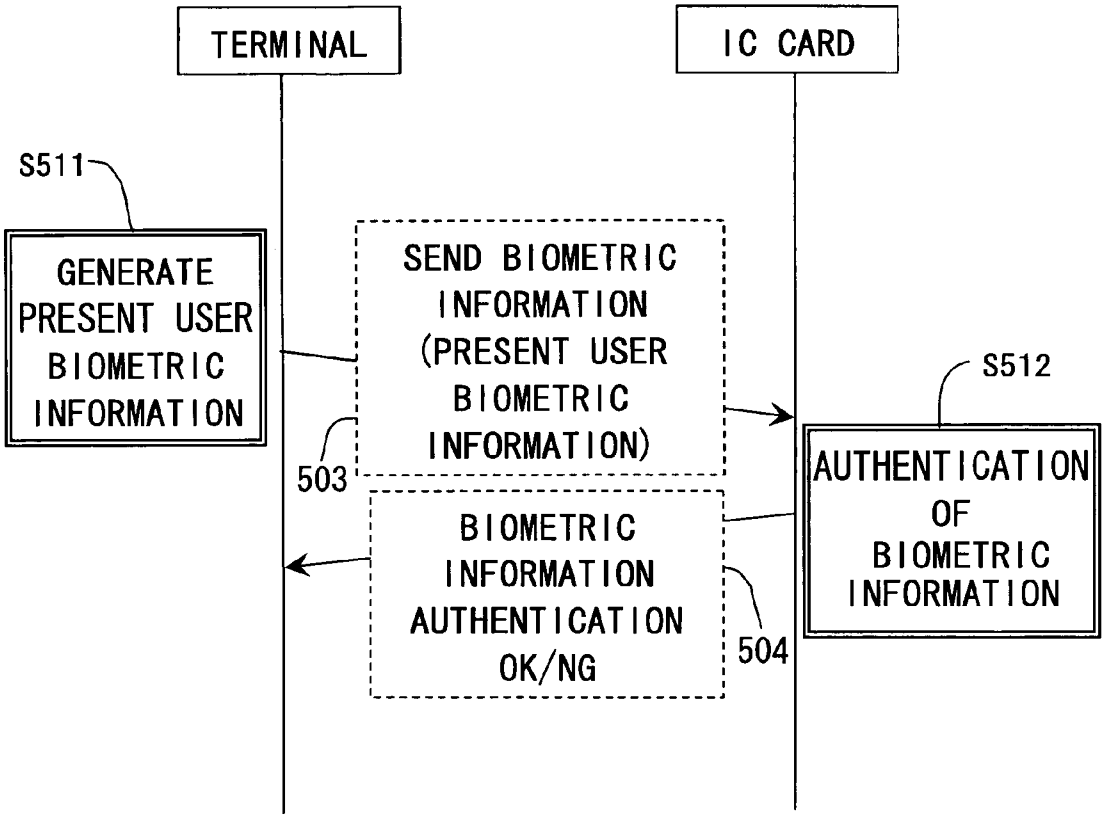
FIG. 5 is a view showing how the information is transferred and received between the terminal and the IC card when authenticating the biometric information.

Next, an operation of the IC card 10 when authenticating the biometric information will be described with reference to FIGS. 5 and 6. FIG. 5 is a sequence chart showing, when authenticating the biometric information, how the information is exchanged between the terminal 30 and the IC card 10 that configure the biometric authentication system according to the present invention.

When the terminal 30 and the IC card 10 comes to a state of getting communicable with each other, the terminal 30 acquires and generates the present user biometric information from the imaging unit 31 (S511). Then, the terminal 30 sends the thus-generated present user biometric information to the IC card 10 (503). The IC card 10 authenticates the received present user biometric information and the biometric information stored in the biometric information storage module 147 (S512: biometric information authentication). Then, the IC card 10 notifies the terminal 30 of a result (504) of the biometric information authentication (S512). When the validity of the biometric information is authenticated on both sides through this biometric information authentication, the user hereafter can get the variety of banking services.

(Explanation of Operation Flow of IC Card 10 in Biometric Information Authentication)

Figure 6:
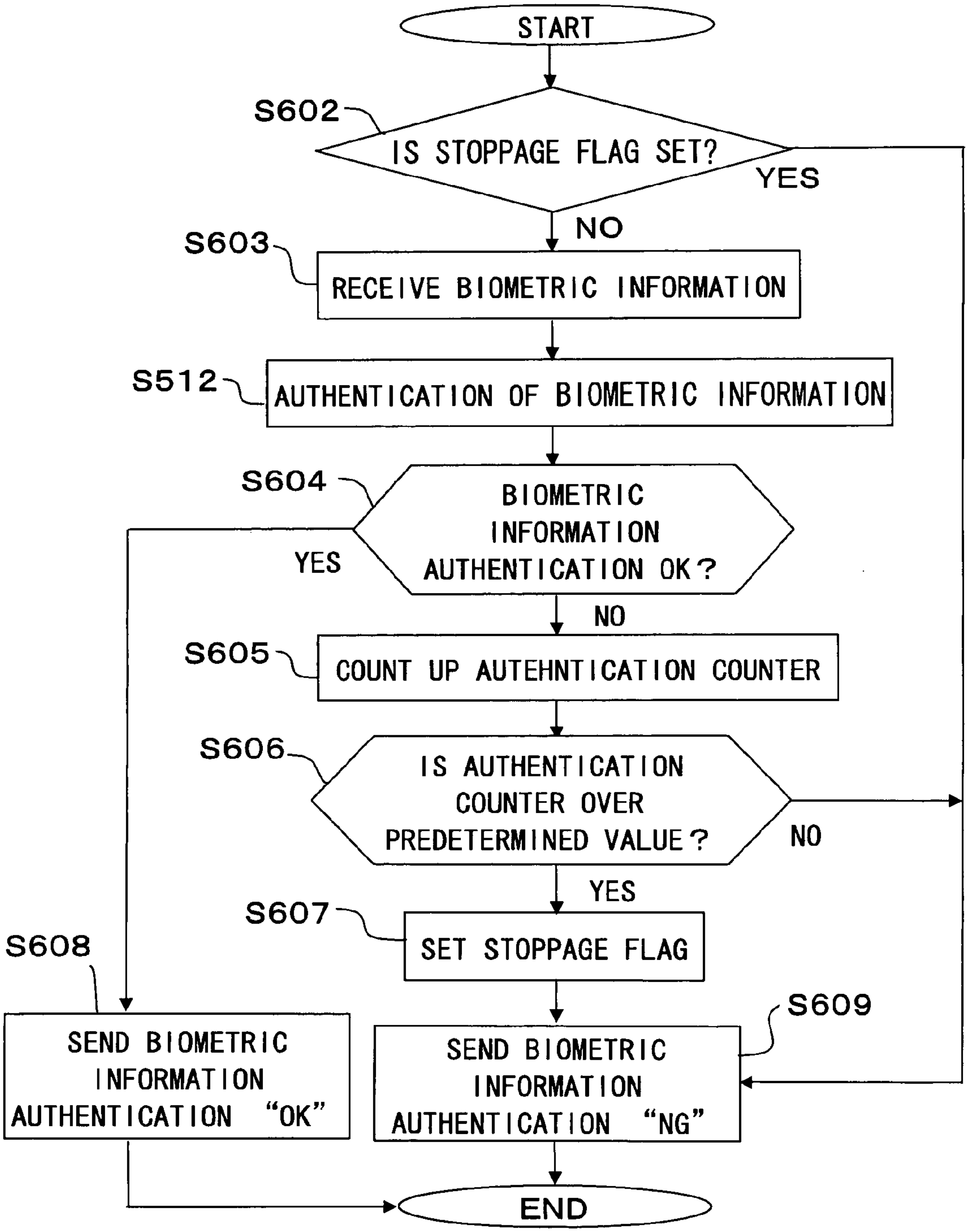
FIG. 6 is a diagram showing a processing flow when in the biometric information authentication of the IC card.

FIG. 6 is a processing flowchart in the biometric information authentication of the IC card 10, and shows an operation of the IC card 10 in the processing sequence described above. Note that the same processes as those of the IC card 10 shown in FIG. 5 are given the same symbols and numerals also in FIG. 6 (S512).

The IC card 10, upon executing the biometric information authentication process, to start with, checks whether the stoppage flag 146 is set or not (S602). In the case where the stoppage flag 146 has already been set (S602: YES), the terminal 30 is notified of a purport that the biometric information authentication can not be completed (S609).

The IC card 10, if the stoppage flag 146 is not set (S602: NO), receives the present user biometric information that will be sent from the terminal 30 later on (S603). Then, the IC card 10 authenticates the received present user biometric information and the biometric information stored in the biometric information storage module 147 (S512: biometric information authentication). When the validity of the biometric information on both sides is authenticated as a result of the biometric information authentication (S512) (S604;YES), the IC card 10 sends, to the terminal 30, a purport that the validity of the biometric information is authenticated (S608). Conversely, when the validity of the biometric information on both sides is not authenticated as a result of the biometric information authentication (S512) (S604; NO), the authentication counter 145 is counted up (S605). Then, as the result, if the value of the authentication counter 145 becomes larger than the predetermined value (S606; NO), the IC card 10 sets the stoppage flag 146 (S607), and notifies the terminal 30 of a purport that the biometric information can not be authenticated (S609). Note that if the value of the authentication counter 145 is equal to or smaller than the predetermined value (S606; YES), the IC card 10 directly notifies the terminal 30 of a purport that the biometric information can not be authenticated (S609).

<Operation and Effects of Embodiment>

As described above, in the biometric information authentication system according to the embodiment of the present invention, the IC card 10 performs, between the terminals 30 and 40 at the bank and the IC card 10 itself, the mutual authentication and the present user biometric information authentication after registering the biometric information, and notifies, when the validity is authenticated, the terminals 30 and 40 of this purport, whereby the user can be hereafter provided with the variety of banking services through the terminals 30 and 40.

The IC card 10 provides the stoppage flag 146 in the memory area unreadable from outside, and controls the execution of the authentication process depending on the state of this stoppage flag 146.

Further, the IC card 10 also has the memory area unreadable from outside with the registration counter 144 and the authentication counter 145, which correspond to the mutual authentication and the biometric information authentication, respectively. The IC card 10, if unable to authenticate the validity as the result of the authentication, counts up the registration counter 144 and the authentication counter 145 each corresponding to the authentication given above.

Then, the stoppage flag 146 is set when the value of the registration counter 144 or the authentication counter 145 becomes larger than the predetermined value.

Thus, the IC card 10 in the embodiment retains each authentication error count by itself and sets, based on this counter (value), the stoppage flag 146 as to whether the subsequent authentication process is to be executed or not.

This contrivance eliminates a necessity of outputting the information such as a remaining number of permissible authentication errors to the terminals 30 and 40 from the IC card 10, and enables prevention of leakage of the information in the IC card.

Moreover, as described above, the IC card 10 in the embodiment sets the single stoppage flag 146 in both of the authentication error occurred when registering the biometric information on the IC card 10 and the authentication error, i.e., the biometric information authentication error about the biometric information registered in the IC card 10 and about the present user biometric information.

With this contrivance, it is possible to batch-check unlawful actions, from different sides, such as unlawful registration of the biometric information, unlawful authentication of the biometric information, and so on.

Moreover, as explained above, the IC card 10 in the embodiment, when the stoppage flag 146 is set, stops all the authentication processes. Namely, an unlawful user is, even when stopping the service once, then removing the IC card 10 from the terminals 30 and 40 and trying to restart the services, unable to any services hereafter.

This contrivance makes it possible to reduce the number of unlawful attacks from the unlawful user.

<Modified Example>

In the IC card 10 in the embodiment of the present invention, the registration counter 144 and the authentication counter 145 are provided on an authentication-by-authentication basis, and are updated when the respective authentication errors occur. These counters may, however, be united into one counter, wherein this counter is counted up for each authentication, and the stoppage flag 146 may be set by comparing this counter value with the predetermined value.

With this contrivance, it is possible to control as to whether the authentication processes are to be stopped or not on the basis of a total value of all the authentication errors.

Moreover, in the IC card 10 in the embodiment of the present invention, the mutual authentication method when registering the biometric information involves using the common key encryption method, and may also involve using a public key encryption method such as RSA encryption, etc.

<Others>

The disclosures of Japanese patent application No. JP2004-296960 filed on Oct. 8, 2004 including the specification, drawings and abstract are incorporated herein by reference.

What is claimed is:

1. A biometric authentication device comprising:

a biometric information storage module storing biometric information;

a biometric information authenticating module performing authentication of an individual using present biometric information acquired from the individual when performing individual authentication and the biometric information stored in said biometric information storage module;

a mutual authentication module mutually authenticating, before storing the biometric information in said biometric information storage module, validity with a connected processing device for acquiring the biometric information to be stored in said biometric information storage module;

a registration counter counted up when the validity with the connected processing device for acquiring the biometric information to be stored in said biometric information storage module is not authenticated in the authentication by said mutual authentication module;

an authentication counter counted up when the validity of the individual is not authenticated in the authentication of the individual by said biometric information authenticating module;

a stoppage flag set when said registration counter or said authentication counter comes to a predetermined value; and an authentication control module performing control of inhibiting an access to said biometric information storage module when said stoppage flag is set, and of preventing said biometric information authenticating module from executing the authentication process when said stoppage flag is set.

2. A biometric authentication device according to claim 1, wherein said biometric information storage module can be read from outside, and said registration counter, said authentication counter and said stoppage flag can not be read from outside.

3. A biometric authentication method utilizing biometric information, comprising the steps of:

acquiring biometric information of an individual from a first processing device and storing the biometric information in a biometric information storage module;

authenticating present biometric information acquired from a second processing device with the biometric information stored in said biometric information storage module to authenticate the individual;

authenticating, before storing the biometric information in said biometric information storage module, validity with said first processing device for acquiring the biometric information to be stored in said biometric information storage module, mutually;

counting up a registration counter when the validity with said first processing device for acquiring the biometric information to be stored in said biometric information storage module is not authenticated by the mutual authentication;

counting up an authentication counter when the validity of the individual is not authenticated in the authentication when executing the individual authentication;

setting a stoppage flag when said registration counter or said authentication counter comes to a value larger than a predetermined value; and performing control of inhibiting an access to said biometric information storage module when said stoppage flag is set, and of preventing the authentication of the biometric information when performing the individual authentication.

4. A computer readable medium having a program stored therein for causing a computer to execute authentication operations utilizing biometric information, the authentication operations comprising:

acquiring biometric information of an individual from a first processing device and storing the biometric information in a biometric information storage module;

authenticating present biometric information acquired from a second processing device with the biometric information stored in said biometric information storage module to authenticate the individual;

authenticating, before storing the biometric information in said biometric information storage module, validity with said first processing device for acquiring the biometric information to be stored in said biometric information storage module, mutually;

counting up a registration counter when the validity with said first processing device for acquiring the biometric information to be stored in said biometric information storage module is not authenticated by the mutual authentication;

counting up an authentication counter when the validity of the individual is not authenticated in the authentication when executing the individual authentication;

setting a stoppage flag when said registration counter or said authentication counter comes to a value larger than a predetermined value; and performing control of inhibiting an access to said biometric information storage module when said stoppage flag is set, and of preventing the authentication of the biometric information when performing the individual authentication.

5. An IC card comprising:

a biometric information storage module storing biometric information;

a biometric information authenticating module performing authentication of an individual using present biometric information acquired from the individual when performing individual authentication and the biometric information stored in said biometric information storage module;

a mutual authentication module mutually authenticating, before storing the biometric information in said biometric information storage module, validity with a connected processing device for acquiring the biometric information to be stored in said biometric information storage module;

a registration counter counted up when the validity with the connected processing device for acquiring the biometric information to be stored in said biometric information storage module is not authenticated in the authentication by said mutual authentication module;

an authentication counter counted up when the validity of the individual is not authenticated in the authentication of the individual by said biometric information authenticating module;

a stoppage flag set when said registration counter or said authentication counter comes to a predetermined value; and an authentication control module performing control of inhibiting an access to said biometric information storage module when said stoppage flag is set, and of preventing said biometric information authenticating module from executing the authentication process when said stoppage flag is set.

* * * * *

UNITED STATES PATENT AND TRADEMARK OFFICE

CERTIFICATE OF CORRECTION

PATENT NO. : 7,610,492 B2
APPLICATION NO. : 11/118493
DATED : October 27, 2009
INVENTOR(S) : Awatsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twelfth Day of October, 2010

David J. Kappos
*Director of the United States Patent and Trademark Office*